United States Patent [19]

Condell, Jr.

[11] Patent Number: 4,543,655
[45] Date of Patent: Sep. 24, 1985

[54] FREE ELECTRON LASER DEVICE FOR SCANNING A SPATIAL FIELD

[75] Inventor: William J. Condell, Jr., Bethesda, Md.

[73] Assignee: The United States of America as represented by the Secretary of the Navy, Washington, D.C.

[21] Appl. No.: 627,304

[22] Filed: Jul. 2, 1984

[51] Int. Cl.$^4$ .............................................. H01S 3/00
[52] U.S. Cl. ........................................ 372/2; 372/99; 315/4
[58] Field of Search ...................... 372/2, 99; 315/4, 5

[56] References Cited

U.S. PATENT DOCUMENTS 3,731,106  5/1973  Mansell ........................... 250/236 R
3,822,410  7/1974  Madey ................................ 331/94.5

OTHER PUBLICATIONS

Marshall; "Free Electron Laser Based upon Stimulated Raman Backscattering"; Int. School of Quantum Electronics, Lrice, Sicily, Aug. 1980.

*Primary Examiner*—William L. Sikes
*Assistant Examiner*—Léon Scott, Jr.
*Attorney, Agent, or Firm*—Robert F. Beers; Arthur L. Branning; Elmer E. Goshorn

[57] ABSTRACT

The improved free electron laser device for scanning a spatial field is generally comprised of a drift tube and a rotatable mandrel. The mandrel is concentrically disposed in the tube so as to define an annular space therebetween. A series of canted mirrors of grooved-like configuration are formed about the mandrel in predetermined spaced relationship to each other and at a predetermined angle to a plane transverse of the mandrel. These mirrors function to reflect and phase redistribute various waves of the wave front so as to form a plurality of asymmetric diffraction patterns in the annular space. By reason of the nutating effect of the canted and rotating mirrors, the projected beam conically and continuously scans a region of the spatial field. In order to minimize the effect of skew waves, a series of circumferentially spaced and longitudinally extending rib-like baffles can be affixed to the tube interior between adjoining mirrors. In another embodiment, a series of longitudinally spaced mirrors of washer-like configuration are pivotally mounted on the mandrel for selectively projecting a laser beam at more than one angle to the device axis so that the beam conically scans more than one region of the field without moving the device itself.

23 Claims, 13 Drawing Figures

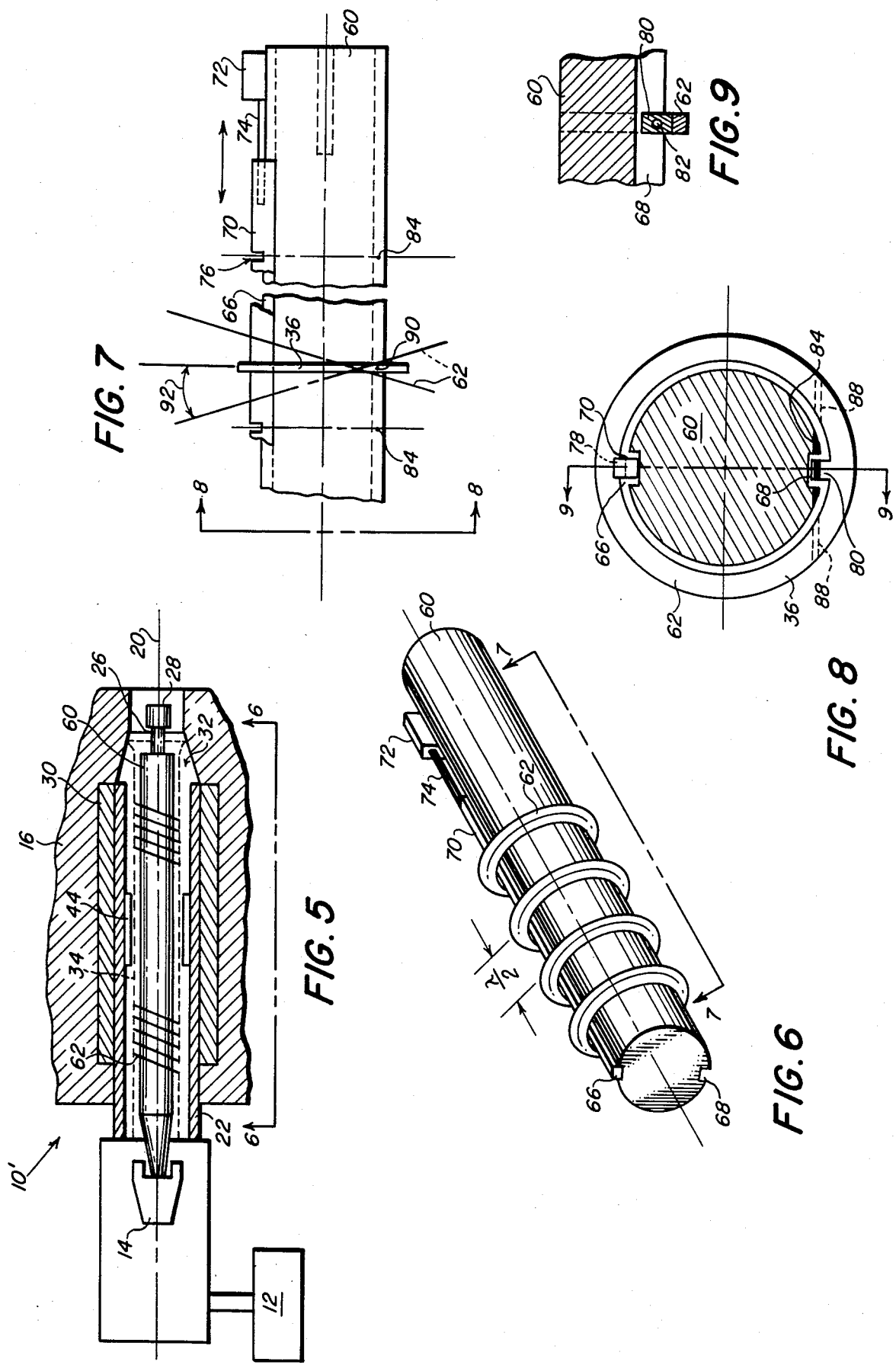

FREE ELECTRON LASER DEVICE FOR SCANNING A SPATIAL FIELD

BACKGROUND OF THE INVENTION

The present invention relates to a free electron laser device for conically scanning a spatial field and more particularly it relates to an improved free electron laser device for reflecting and steering various waves of a wave front so as to cause phase redistribution of the reflected waves that results in formation of asymmetric diffraction patterns and projection of a laser beam from the device to conically scan a spatial field.

Various techniques have been used in the past for generating relativistic electron beams and for magnetically exciting the beams so as to form a radiation wave front. Such techniques are exemplified by U.S. Pat. No. 3,822,410 to Madey that discloses an electron laser device. The device is generally made up of an accelerator for controlling the formation of an electron beam and a magnetic array for controlling the periodic excitation of the beam to form a radiation beam. Also, U.S. Pat. No. 3,731,106 to Mansel discloses a rotary mechanical beam scanner for deflecting various predetermined portions of a propagating wave front so as to facilitate an analysis of the high power laser generating the wave front. Similarly, a report of the Plasma Laboratory at Columbia University is entitled "Free Electron Lasers Based Upon Stimulated Raman Backscattering: A Survey" by T. C. Marshall. This report was presented at the Ettore Majorana Center, International School of Quantum Electronics, Irice, Sicily on August 1980. A laser device as disclosed on pages 12-13 of the report is considered pertinent. The device is generally comprised of a drift tube and a nonrotating mandrel which is disposed concentrically within the tube and which is provided with annular grooves. One of the primary purposes of the grooves is to reflect the radiation in order to enhance the coherence and stability of the radiation wave front as it propagates lengthwise of the tube and in a direction toward the outer end. The grooves form distributed feedback mirrors. However, neither the prior art nor the prior lab report, as discussed above, whether taken singly or in any combination, remotely suggest, among other things, an improved free electron laser device with a rotatable mandrel having a series of canted mirrors formed thereabout not only for redistributing the phase of various waves of the wave front so as to induce asymmetry therein, but also for steering the redistributed and asymmetric wave front so as to form a laser as it projects from the device outer end for conical scanning of a spatial field.

SUMMARY OF THE INVENTION

An object of the invention is to provide an improved free electron laser device with a rotatable mandrel having a series of longitudinally spaced and canted mirrors for redistributing the phases of various waves of the wave front so that the redistributed waves form a beam that is steered in a conical fashion about the device axis as it emerges from the device.

Another object of the invention is to provide an improved free electron laser device with a series of mirrors not only disposed in the combined electron beam pathway and wave guiding cavity of the device, but also disposed about the rotatable mandrel in the cavity so that the mirrors do not interfere with propagation of the electron beam between the ends of the combined electron beam pathway and wave forming cavity.

Still another object of the invention is to provide an improved free electron device of compact construction by providing a drift tube, a rotatable mandrel and canted mirrors disposed about the mandrel for reflecting various waves of the radiation wave front so as to redistribute the phase of the various mirror reflected waves prior to projection of a laser beam from the device as formed from these waves.

Yet another object of the invention is to provide an improved free electron laser device not only for projecting a laser beam to conically scan a spatial field about the device longitudinal axis but also for selectively projecting the beam at more than one angle in relation to the device longitudinal axis so as to increase the scanning capability of the device.

Yet, still another object is to provide an improved free electron laser device with a plurality of baffles for reflecting skew waves that would otherwise be lost so as to enhance the coherency and density of the laser beam projected from the device.

A summary of the invention is an improved free electron laser device. The device is generally made up of a drift tube and a rotatable mandrel concentrically disposed in the tube so as to define a combined electron beam pathway and wave guiding cavity of annular shape between the tube and mandrel. The device is provided with a combined power supply and magnetic field arrangement for generating and guiding a free electron beam of annular shape as it propagates along the pathway longitudinally of the device between its ends. Another magnetic field arrangement generates a second magnetic field in a direction generally transverse to the device longitudinal axis. The second field acts to excite the electrons of the beam to lase and form a radiation wave front of annular shape in the cavity. A series of canted mirrors of grooved-like configuration are formed about the mandrel in predetermined spaced relationship to each other such that each mirror is disposed at a predetermined angle in relation to a transverse plane of the mandrel. In another embodiment of the invention a series of mirrors of washer-like configuration are arranged about the mandrel such that each mirror is pivotally connected to the mandrel about an associated transverse axis thereof. An actuator is mounted on the mandrel and connected to each washer-like mirror of the series for selectively controlling the pivotal movement of each mirror of the series all without interfering with both electron beam and wave front propagation during device use. In either embodiment of the mirrors, the mirrors are preferably arranged in two sets with each set being disposed at either mandrel end. The mirrors reflect various waves of the wave front so as not only to redistribute the phase relationship of the reflected waves to form asymmetric diffraction patterns, but also to steer the patterns in order to project an asymmetric diffraction patterned laser beam of conical shape from the device into a spatial field so as to conically scan a region of the field about the device axis. Moreover, the washer-like mirrors in being pivotally mounted are selectively positionable so that the beam can conically scan more than one region of the field without moving the device, Further, the interior of the drift tube is provided with a series of longitudinally extending and circumferentially spaced baffles for reflecting or absorbing skew waves so as to enhance the coherency and density of the projected beam. The baffles are arranged so as not to interfere with beam propagation and are interposed between adjoining mirrors.

Other objects, advantages and novel features of the invention will become apparent from the following detailed description of the invention when considered in conjunction with the accompanying drawings, wherein:

FIG. 5 is a longitudinal sectional view with portions removed and other portions broken away of another embodiment of the mandrel for the device of the invention.

FIG. 6 is an enlarged perspective view with parts removed and other parts added as taken along line 6—6 of FIG. 5 and illustrates further details of the invention.

FIG. 7 is an elevational view taken along line 7—7 of FIG. 6 with parts removed and other parts broken away.

FIG. 8 is an end view taken along line 8—8 of FIG. 7.

FIG. 9 is a cross-sectional view taken along line 9—9 of FIG. 8 and with parts broken away.

DETAILED DESCRIPTION OF THE INVENTION

Figure 1:
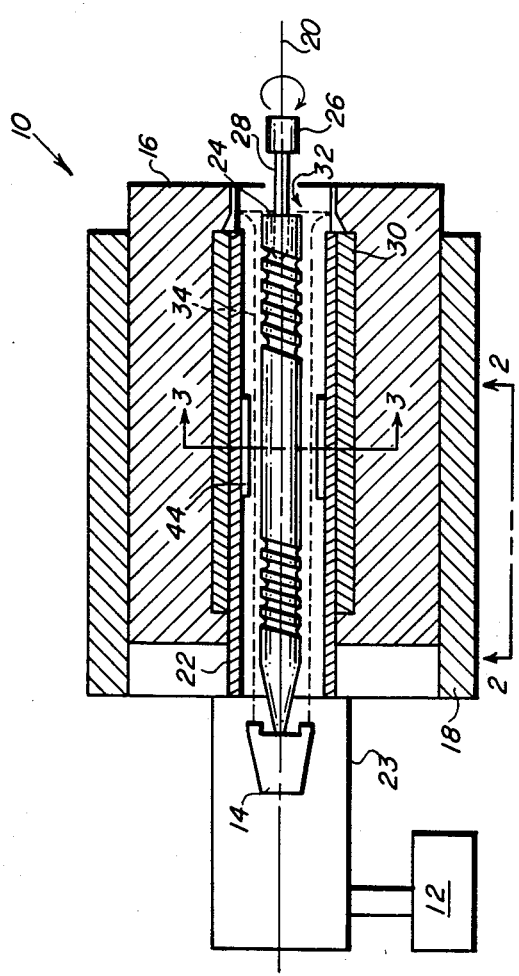
FIG. 1 is a diagrammatic and longitudinal sectional view of a free electron laser device that embodies the present invention.

With further reference to FIG. 1, a free electron laser device 10 is generally comprised of a power supply 12, a cathode 14, an anode 16, and a magnetic field generating arrangement 18. The anode and cathode are axially aligned with the device longitudinal axis 20. A cylindrical drift tube 22 of suitable waveguide and dielectric material is concentrically disposed about the interior of anode 16. The inner end of the tube abuts against an end of a housing 23 that includes cathode 14. A rotatable mandrel 24 of appropriate waveguide and/or dielectric material is aligned with the device longitudinal axis. The inner reduced end of the mandrel is bearingly connected to cathode 14. The outer end of the mandrel is bearingly supported by a spider-like bearing subassembly (not shown) interposed between and connected to the mandrel and anode. An electric motor 26 and its output shaft 28 are connected to the outer end of the mandrel for effecting mandrel rotation during use of the device as shown in FIG. 1. A Wiggler magnetic field generating apparatus 30 is concentrically interposed between tube 22 and anode 16. The outside diameter of mandrel 24 is less than the inside diameter of tube 22 so as to define an annular space 32 that extends between the inner end of tube 22 and the outer end of anode 16. The radial distance between tube 22 and mandrel 24 is preferably about a half wavelength ($\lambda/2$) of the waves of the radiation wave front formed during device operation. The annular space advantageously serves as a combined electron beam pathway and a radiation wave guide.

Power supply 12 includes an appropriate source (not shown) for meeting the power requirements (voltage and amperage) for cathode 14 to emanate an electron beam 34 of annular shape that propagates along pathway 32 toward the anode outer end as depicted by dotted lines in FIG. 1. Associated variable resistance and capacitance circuitry for interconnecting power supply 12 and cathode 14 for effecting generation of beam 34 is not shown for the sake of brevity.

The mandrel is provided on its outer periphery with a series of canted mirrors 36 of grooved-like configuration and annular extent. The grooved-like configuration of each mirror is in effect a canted channel-shaped recess in the mandrel outer periphery such that the centerlines of adjoining mirrors are spaced a predetermined distance apart, preferably a half wavelength ($\lambda/2$) of a radiation wave front as indicated in FIG. 2. The centerline of each mirror is disposed at a predetermined angle in relation to a plane transverse of the mandrel as indicated at 38 in FIG. 4. The angle should be such so as to assure projection of an asymmetric diffraction patterned laser beam from the device outer end. In one reduction to practice a suitable angle 38 for each canted mirror 36 relative to a transverse plane of the mandrel has been found to be seven degrees (7°).

Figure 2A:
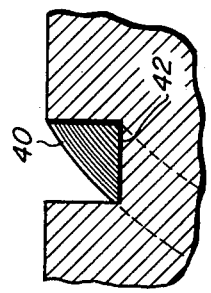
FIG. 2A is an enlarged longitudinal section taken within encircling line 2A of FIG. 2 and illustrates further details of the grooved-like configuration of each mirror.
Figure 2:
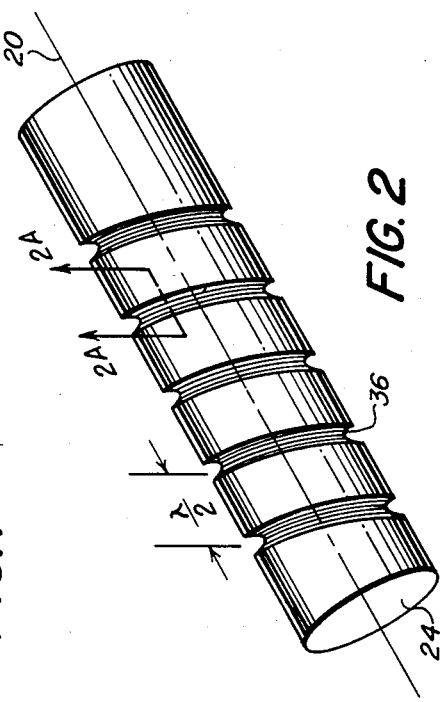
FIG. 2 is an enlarged perspective view with parts removed and other parts added as taken along line 2—2 of FIG. 1 and illustrates further details of the invention.

Each mirror element is made up of opposed and parallel spaced annular chordal surfaces 40 that define the opposed sidewalls of the groove as best shown in FIG. 2A. An annular surface 42 that is arranged concentric about the mandrel axis intersects opposed surfaces 40 at their inner radial extent so as to define the bottom of the groove. The depth and longitudinal extent of the groove for each grooved mirror 36 should be such as to enable maximum reflectivity of various waves of the wave front without destructive interference while at the same time causing redistribution of the phase relationship of the reflected waves to form between tube 22 and rotating mandrel 24 an asymmetric diffraction pattern. The longitudinal extent of each mirror should be about a quarter wavelength ($\lambda/4$) while the depth thereof should also be about a quarter wavelength ($\lambda/4$).

The actual number of mirrors in the series of grooved-like mirrors 36 for the mandrel of course will depend upon the design and operational characteristics of each device. As evident from FIG. 1 and for purposes of illustration, the series of mirrors are made up of two sets of mirrors with each set being made up of five (5) mirrors at either end of the mandrel. In other words, depending upon the coherency and intensity of the asymmetric diffraction patterned beam projected by the device, the series of mirrors formed about the mandrel could be more or less than the series of mirrors as shown in FIG. 1 and without the series being made up in two sets as also shown in FIG. 1. With the series of mirrors being made up of two sets, each set is spaced from the other set at a distance substantially corresponding to a multiple of the wavelength of the radiation wavefront.

A plurality of eight (8) longitudinally extending and circumferentially spaced baffles 44 are affixed to the interior surface of tube 22 and interposed between the longitudinally spaced two sets of mirrors of the series of mirrors 36 as best illustrated in FIG. 1. The purpose of the baffles is to redirect or absorb the skew waves of the wave front so as to enhance the coherency of the reflected diffraction patterns within the wave cavity 32 prior to an asymmetric patternd beam being projected from the outer end of the device during its operation. Although device 10 is provided with a plurality of eight baffles, the actual number of baffles would depend on the coherency of the reflected patterns within cavity 32. Each baffle 44 projects radially inward into the cavity no less than about a quarter wavelength ($\lambda/4$) so as not to interfere with the propagation of the electron beam as depicted in FIG. 3

Figure 3:
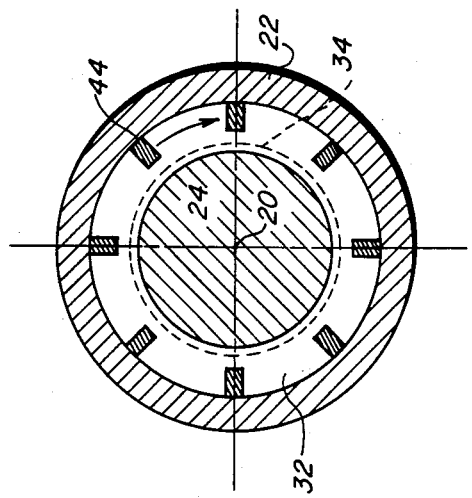
FIG. 3 is an enlarged cross-sectional view taken along line 3—3 of FIG. 1.
Figure 4A:
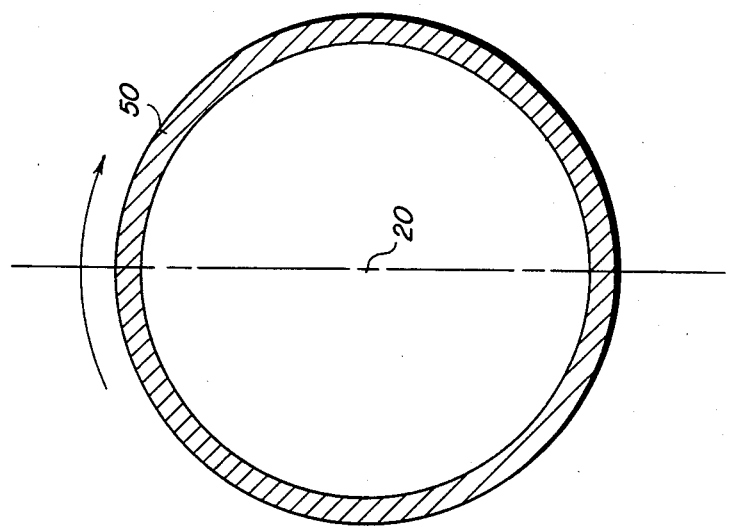
FIG. 4A is a cross-sectional view taken along line 4A—4A of FIG. 4 with parts removed and illustrates the major lobe of the laser beam.
Figure 4:
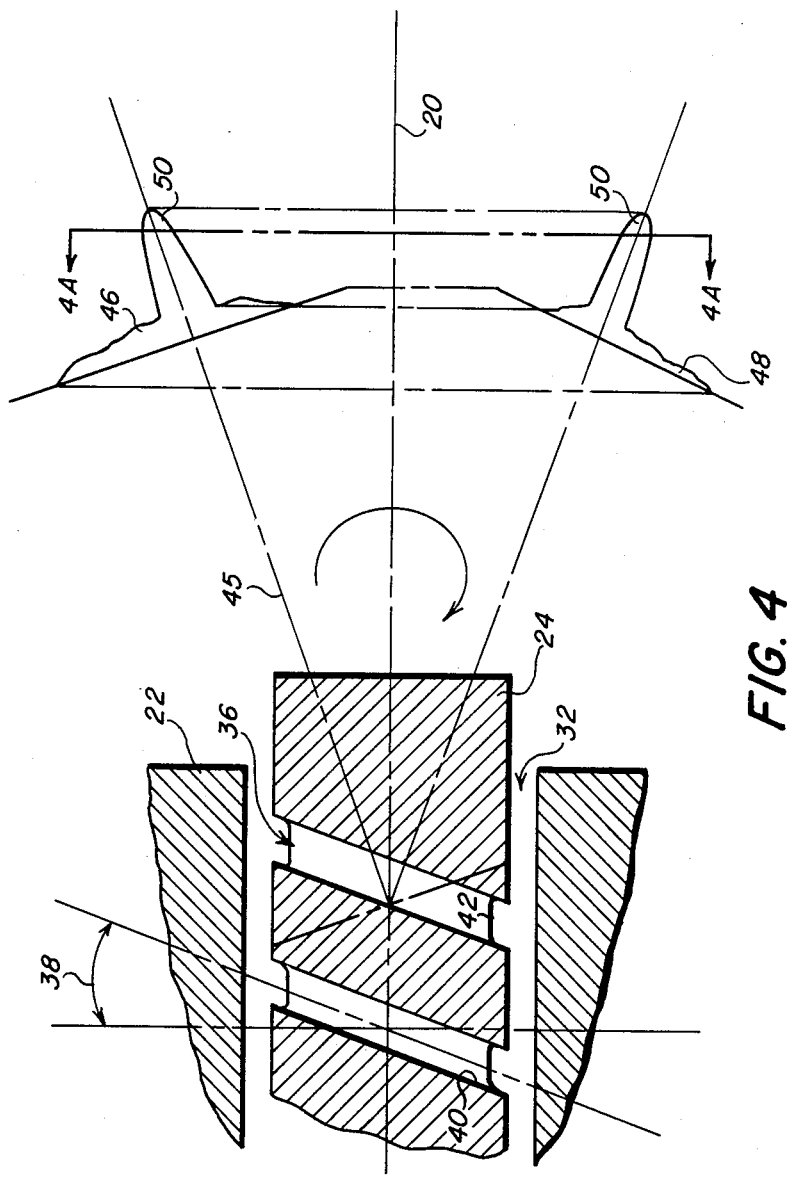
FIG. 4 is a longitudinal sectional view of the device of FIG. 1 with parts removed and other parts broken away and illustrates an operative embodiment of the invention.

During operation of device 10, motor 30 rotates mandrel 24 clockwise at a suitable speed as shown in FIGS. 3-4. At the same time power supply 12 functions to emanate electron beam 34. The Wiggler magnetic field arrangement 32; with appropriate periodicity, generates a field transverse to the device axis 20 to perturb the electrons of the beam. As the result of these perturbations the electrons are excited and lase to progressively form a coherent radiation wave front of annular shape within cavity 32.

Prior to various waves of the wave front being reflected by mirrors 36 during device operation, they are initially scattered at different points throughout space 32 about mandrel 24. Since the various waves prior to being reflected are spaced about a half wavelength ($\lambda/2$) apart in space 32, reflection and re-reflection of these waves by chordal and annular surfaces 40 and 42 of the series of canted mirrors 36 will cause the phase relationship of the reflected waves to be redistributed so as to form a different phase relationship of the mirror-reflected waves about mandrel 24. This different phase relationship of the mirror-reflected and redistributed waves results in the formation of an asymmetric diffraction pattern. By reason of the nutating effect of the canted mirrors during mandrel rotation together with the mirrors being spaced a predetermined distance apart, the pattern is progressively steered at an angle about the device axis toward the device outer end. As the result of this steering of a pattern toward the device outer end, an asymmetric patterned laser beam is projected from the device to conically scan a spatial field about device axis 20 at a Rayleigh region thereof. Moreover, by virtue of the rotating and nutating effect of each canted mirror 36, the projected diffraction patterned beam is formed about a conical axis of revolution that is perpendicular to the outwardly facing chordal face 42 of the outer mirror as shown in FIG. 4. Each radial cross section, e.g., sections 46 and 48, of the projected beam includes a major lobe 50 as indicated in FIGS. 4 and 4A. It is noted here that waves of the wave front in space 32, that are not reflected by the canted mirrors during device operation, maintain symmetry about device axis 20 and are projected from the device outer end without interfering with the conical scanning of the spatial field by the projected beam. One advantage of the device in projecting an asymmetric patterned beam is that the major lobe of the beam can be used to detect an object in the field as the result of modulation of the lobe by the object.

In another embodiment of a free electron laser device 10 it is comprised of a mandrel 60 having a series of pivotally mounted mirrors 62. Each mirror is of washer-like configuration and is comprised of a suitable grade of sheet-like material as shown in FIG. 5. For the sake of simplicity, it is to be understood that elements of device 10' that correspond to elements in device 10 have been designated with the same reference numeral. Each mirror has an inside diameter greater than the outside diameter of the mandrel so as not to inhibit the limited pivotal movement of the mirror about a transverse axis of the mandrel. Similarly, the outside diameter of each mirror has a diameter less than the interior diameter of tube 22 so as to have sufficient clearance between the tube and the mirror during mirror pivotal movement relative to mandrel 60. Further, each mirror regardless of its pivotal position in relation to the mandrel, has an outside diameter so as not to interfere with the propagation of electron beam 34 in cavity 32. As with the series of mirrors 36 of FIGS. 1-4, the series of mirrors 62 are illustrated as two sets of mirrors with each set of five mirrors being disposed at either end of the mandrel.

Opposed diametrical portions of mandrel 60 are cut away between opposed ends of the mandrel so as to define opposed longitudinally extending channel-shaped grooves 66 and 68 as shown in FIG. 6. An actuator bar 70 is slidably mounted in groove 66. A reversible motor 72 of appropriate design is affixed to the outer end of mandrel 60 adjacent groove 66. A motor output shaft 74 is threadably connected to the inner end of bar 70. Depending upon the direction of rotation of motor 72 and by reason of the threaded connection between bar 70 and shaft 74, bar 70 will move in a direction longitudinally toward or away from motor 72.

Bar 70 is provided with a series of ten transverse upwardly facing slots 76, two of which are shown in FIG. 7. The inner circumferential edge of each mirror is provided with a depending lug portion 78 as depicted by dotted lines in FIG. 8. The inward radial extent of each lug 78 is somewhat less than the depth of slot 76 so as to assure a non-binding connection between the lug of each mirror and the associated slot of bar 70 during pivotal movement of the mirror relative to mandrel 60. Each mirror also includes another radially inwardly extending lug 80 which extends from its inner circumferential edge and which is disposed diametrically opposite lug 78. Lug 80 is provided with a transverse opening 82 for receiving a pin shaft as depicted in FIG. 9.

A series of transverse chordal openings 84 of pin shaft size are provided in mandrel 60. Each opening intersects groove 68 such that the axis of each opening 84 lies in a transverse plane that includes the axis of its associated slot 76 in bar 70 when the bar is in its median position as shown in FIG. 7. Also, opposed portions of each mirror 62 on either side of lug 80 are provided with aligned chordal openings 88 that are alignable with their associated mandrel openings 84 as shown in FIG. 8.

The purpose of these chordal openings 88 in each mirror is to facilitate pivotal connection of each mirror to mandrel 60. To this end, each mirror 62 is initially loosely assembled to actuator bar 70 so that lug 80 of each mirror is inserted in its respective slot 76 of bar 70. Then, the bar and mirrors are loosely assembled to mandrel 60 by sliding bar 70 in groove 66 until the bar is in its median position. With the bar in its median position, openings 82 and 88 of each mirror are alignable with its associated openings 84 of mandrel 60 whereby a pin shaft 90 can be inserted through the aligned openings (84 of the mandrel and 82 and 88 of the mirror) so as to pivotally connect each mirror about the transverse axis of shaft 90 as depicted in FIG. 7. Upon pivotally connecting each mirror to mandrel 60, motor output shaft 74 can be threadably connected to bar 70.

Since the inside diameter of each mirror 62 is greater than the diameter of the mandrel and since the outside diameter of each mirror is less than the inside diameter of tube 22, each mirror has limited but free pivotal movement in either direction about pin shaft 90 depending upon the longitudinal directional movement of bar 70 during actuation of motor 72. Each mirror can be pivoted about seven degrees (7°) on either side of its median position as indicated at 92 in FIG. 7.

Figure 10A:
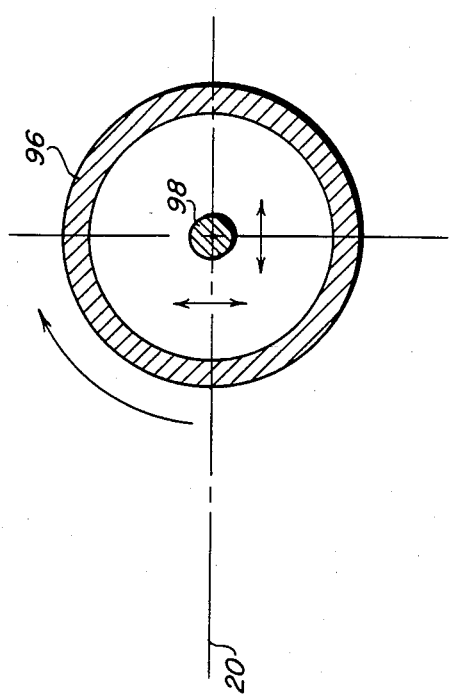
FIG. 10A is a cross-sectional view taken along line 10A—10A of FIG. 10 with parts removed and illustrates the major lobe of the laser beam in more than one radial position about the device axis during more than one operative embodiment of the device.
Figure 10:
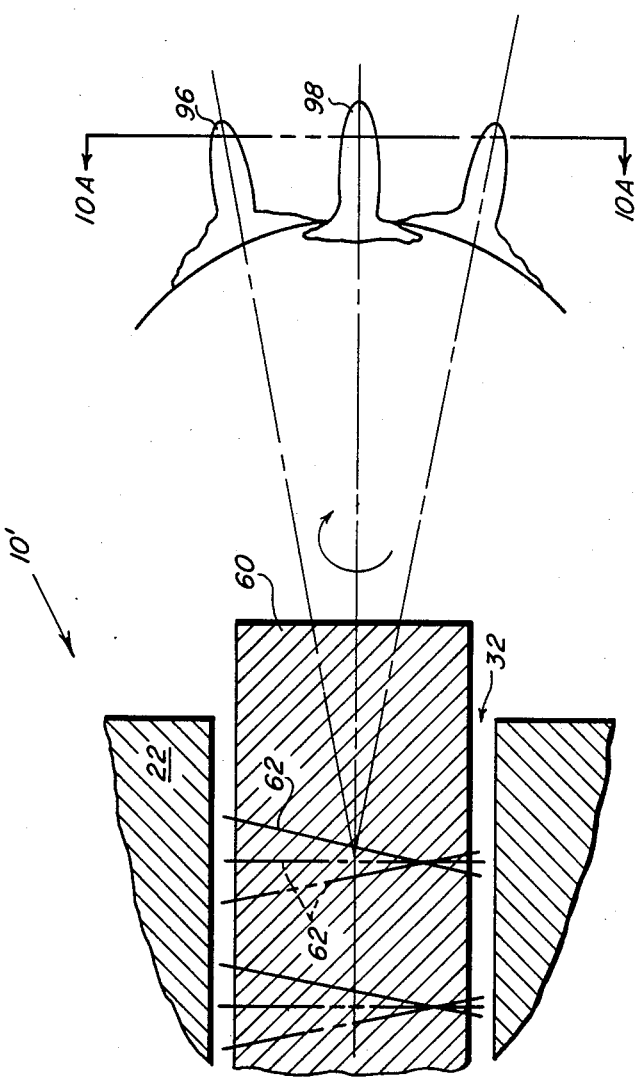
FIG. 10 is another longitudinal sectional view of the device of FIG. 5 with parts removed and other parts broken away and illustrates more than one operative embodiment thereof.

During operation of device 10' as shown in FIGS. 10 and 10A, rotating and nutating mirrors 62 project an asymmetric diffraction patterned laser beam from the device outer end in similar fashion as with device 10 of FIGS. 1-4A. However, since mirrors have selected pivotal movement, the projected beam can have more than one angular position about the device axis. In other words, when mirrors 62 are in either a left or right pivotal (canted) position, a projected beam 96 will be disposed at a conical angle about device axis 20. Similarly, when mirrors are in their median or noncanted position, a projected beam 98 will scan a region of the spatial field along the device axis. Hence, by virtue of mirrors 62 having selected pivotal movement, the projected beams sweep laterally across a spatial field so as to enable conical scanning of more than one region of the field without moving the device.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A free electron laser device for conically scanning a spatial field, said device comprising:
   a drift tube disposed concentrically about the longitudinal axis of the device,
   mandrel means of less diameter than the drift tube concentrically and rotatably mounted therein so as to define an annular space between the mandrel means and the drift tube interior surface,
   cooperating power supply means and magnetic field means for generating and guiding a free electron beam of annular shape as it propagates in a direction longitudinally of the tube toward its outer end and in the annular space between the tube and mandrel means,
   Wiggler magnetic field means concentrically disposed about the drift tube for generating a magnetic field in a direction generally transverse of the device longitudinal axis, the Wiggler magnetic field means for exciting the electrons of the beam to lase and form a radiation wave front of annular shape in the annular space between the tube and mandrel means, the wave front propagating toward the tube outer end,
   a series of canted mirror means of grooved-like configuration being formed in the mandrel, the centerline of each of the mirror means being disposed at a predetermined angle in relation to a plane transverse of the mandrel, the centerlines of adjacent mirror means of the series being spaced a predetermined distance apart, and
   motor means connected to the mandrel means for rotating the same about its longitudinal axis including the series of canted mirror means formed therein during formation of a propagating wave front so that each of the canted mirror means reflects various waves of the front in order not only to redistribute the phases of the reflected waves to form asymmetric diffraction paterns in the annular space, but also to progressively steer the patterns toward the device outer end so as to form an asymmetric diffraction patterned laser beam and to project the laser beam from the device outer end into a spatial field about the device longitudinal axis and at an angle thereto, such that the major lobe of the projected beam conically scans a region of the field about the device axis.

2. A laser device as in claim 1 wherein the predetermined angle between the longitudinal axis and the centerline of each mirror means is approximately seven (7) degrees.

3. A laser device as in claim 1 wherein the predetermined distance between the centerlines of adjacent mirror means of the series is on the order of a half wavelength of the wave front.

4. A laser device as in claim 1 wherein the difference in the radius between the mandrel means and the tube is about a half wavelength of the wave front.

5. A laser device as in claim 1 wherein the series of mirrors are made up of two sets of mirror means, one at either end of the mandrel means.

6. A laser device as in claim 1 wherein mirror means of the series at the outer end of the device function to reflect and project the laser beam into the spatial field for conically scanning about the device axis during rotation of said mandrel means.

7. A laser device as in claim 1 wherein a series of longitudinally extending baffle means are circumferentially spaced about the interior surface of the drift tube and interposed between at least a pair of adjoining mirror means of the series of mirror means, the series of baffle means for reflecting skew waves of the wave front so as to enhance the coherency and density of the laser beam projected from the device outer end.

8. A free electron laser device for conically scanning a spatial field, said device comprising:
   a drift tube disposed concentrically about the longitudinal axis of the device,
   mandrel means of less diameter than the drift tube being concentrically and rotatably mounted therein so as to define an annular space between the mandrel means and the drift tube interior surface,
   cooperating power supply means and magnetic field means for generating and guiding a free electron beam of annular shape as it propagates in a direction longitudinally of the tube toward its outer end and in the annular space between the tube and mandrel means,
   Wiggler magnetic field means concentrically disposed about the drift tube for generating a magnetic field in a direction generally transverse of the device longitudinal axis, the Wiggler magnetic field means for exciting the electrons of the beam to lase and form a radiation wave front of annular shape in the annular space between the tube and mandrel means, the wave front propagating toward the tube outer end.

a series of canted mirror means of washer-like configuration disposed about the mandrel means, each of the mirror means extending generally transverse of the mandrel means and being pivotally connected to the mandrel means for limited movement about a pivotal axis generally transverse of the longitudinal axis of the device, each mirror means being longitudinally spaced a predetermined distance from an adjoining mirror means and having an inside diameter greater than the diameter of the mandrel means while at the same time having a outside diameter less than the inside diameter of the drift tube, actuator means mounted on the mandrel means and connected to each mirror means of the series for selectively controlling the pivotal movement of each mirror means, and motor means connected to the mandrel means for rotating the same about its longitudinal axis including the series of canted mirror means during formation of a propagating annular wave front in the annular space so that each of the canted mirror means reflects various waves of the front in order not only to redistribute the reflected waves to form asymmetrict diffraction patterns in the annular space but also to progressively steer the patterns toward the device outer end so as to form an asymmetric diffraction patterned laser beam and to project the laser beam from the device outer end into a spatial field about the device longitudinal axis and at an angle thereto such that the major lobe of the projected beam conically scans a region of the field about the device axis during rotation of said mandrel means.

9. A laser device as in claim 8 wherein the difference between the tube radius and the mandrel means radius is approximately a half wavelength of the wave front.

10. A laser device as in claim 8 wherein adjoining mirror means of the series are longitudinally spaced at a predetermined distance from each other on the order of a half wavelength of the wave front.

11. A laser device as in claim 8 wherein the outside diameter of each mirror means is substantially less than the tube inside diameter so as not to interfere with the propagation of the electron beam during operation of the device.

12. A laser device as in claim 8 wherein said actuator means is comprised of an elongated rod-like means slidable in a longitudinal recess of the mandrel means, the rod-like means including a plurality of longitudinally spaced transverse slots, each mirror means of the series having a depending lug, each slot receiving a depending lug of its associated mirror means so as to connect all of the mirror means of the series to the actuator means, and wherein said actuator means includes a motor means mounted on said mandrel means and connected to said rod-like means for selectively moving said rod-like means relative to said mandrel means so as to control pivotal movement of the mirror means about its pivotal axis relative to the mandrel means.

13. A laser device as in claim 8 wherein said tube includes a plurality of longitudinally extending buffer means interposed between and spaced from an adjoining pair of mirror means of the series of mirror means, each of the buffer means extending radially inward from the tube but spaced outwardly from said mandrel means and being disposed in circumferentially spaced relation to each other about the longitudinal axis of the device, and said buffer means for reflecting skew waves of the wave front so as to enhance the coherency and density of the laser beam projected from the device.

14. A laser device as in claim 8 wherein the series of mirror means are comprised of first and second sets of mirror means disposed at either end of the mandrel means.

15. A laser device as in claim 8 wherein said actuator means includes means for limiting the pivotal movement of each mirror means to an angle of at least approximately seven degrees (7°) on either side of a plane transverse of the mandrel means, and wherein a transverse plane includes the pivotal axis of the associated mirror means.

16. A method for conically scanning a spatial field, said method comprising the steps of:

generating a free electron beam of annular configuration for propagation within and along the annular space between a drift tube and rotatable mandrel means and in a direction toward the tube outer end, the mandrel means being concentrically disposed in the tube and arranged in alignment with the device longitudinal axis.

subjecting the electrons of the beam to a Wiggler magnetic field disposed transversely of the device longitudinal axis so as to excite the electrons to form a wave front of annular shape that propagates in a direction toward the tube outer end, reflecting various waves of the wave front by a series of canted mirror means disposed about the mandrel means in longitudinally spaced relation to each other, each mirror means also being arranged at a predetermined angle in relation to a plane transverse of the mandrel means, the mirror means not only redistributing the phase of the reflected waves so as to form asymmetric diffraction patterns in the annular space but also to progressively steer the diffraction patterns of the reflected waves towards the outer end of the device so as to form an asymmetric diffraction patterned laser beam all during rotation of the mandrel means, and continuously projecting the laser beam of conical shape from the outer end of the device into a spatial field, a radial cross-section of the projected beam having a major lobe disposed at an angle about the device axis such that the major lobe conically scans the field during rotation of the mandrel means.

17. A method as set forth in claim 16 wherein the step of reflecting various waves is effected by a series of canted mirror means of grooved-like configuration formed about the outer periphery of the mandrel means between its ends, adjoining mirror means of the series being spaced a predetermined distance apart, and each mirror means of the series is disposed at a predetermined angle in relation to a transverse plane of the mandrel means.

18. A method as set forth in claim 17 wherein adjoining mirror means are spaced apart about a half wave length.

19. A method as set forth in claim 17 wherein each mirror means is disposed at an angle of up to at least about 7°.

20. A method as set forth in claim 16 wherein the step of reclecting various waves is effected by a series of canted mirror means of washer-like configuration, each mirror means being disposed about the mandrel means and pivotally connected to the mandrel means about its associated transverse axis thereof.

21. A method as set forth in claim 20 wherein each mirror means is selectively positionable at a predetermined angle in relation to a plane transverse of the mandrel means, such that the plane includes the transverse axis about which the associated mirror means is pivotally connected to the mandrel means.

22. A method as set forth in claim 21 wherein each mirror means is selectively positionable at an angle of at least about 7° on either side of its associated plane.

23. A method as set forth in claim 21 wherein the step of projecting the laser beam is selectively projected at more than one angle in relation to the device longitudinal axis in response to selectively positioning each mirror means of the series of mirror means at more than one angle in relation to the mandrel means so that the major lobe of the projected beam moves transversely of the device longitudinal axis in response to selective positioning of the mirror means and thus conically scans more than one annular region of the spatial field during rotation of said mandrel means.

* * * * *